No. 756,463. PATENTED APR. 5, 1904.
C. B. BOSWORTH.
BLOW-OFF VALVE.
APPLICATION FILED MAY 7, 1903.
NO MODEL.
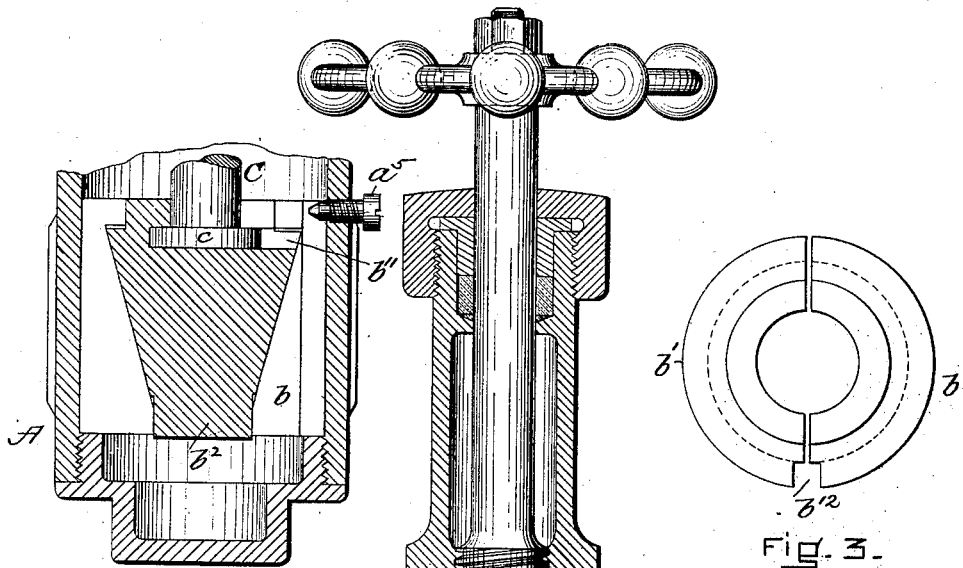
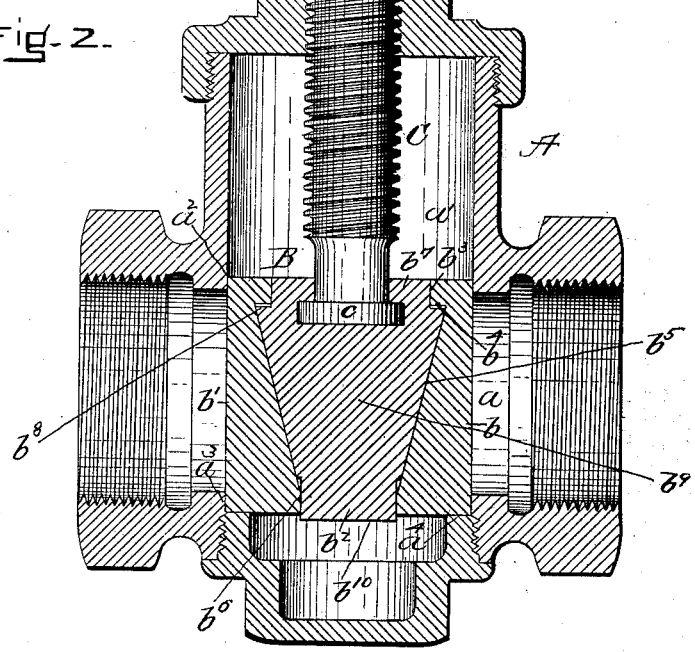
WITNESSES. INVENTOR.

No. 756,463. Patented April 5, 1904.

UNITED STATES PATENT OFFICE.

CHARLES B. BOSWORTH, OF SOMERVILLE, MASSACHUSETTS, ASSIGNOR TO STAR BRASS MANUFACTURING COMPANY, OF BOSTON, MASSACHUSETTS, A CORPORATION OF MASSACHUSETTS.

BLOW-OFF VALVE.

SPECIFICATION forming part of Letters Patent No. 756,463, dated April 5, 1904.

Application filed May 7, 1903. Serial No. 155,992. (No model.)

*To all whom it may concern:*

Be it known that I, CHARLES B. BOSWORTH, a citizen of the United States, and a resident of Somerville, in the county of Middlesex and State of Massachusetts, have invented a new and useful Improvement in Blow-Off Valves, of which the following is a full, clear, and exact description, reference being had to the accompanying drawings, forming a part of this specification, in explaining its nature.

My invention relates to an improved valve of the kind having a straightaway passage, and especially designed as a blow-off valve.

The object of my invention is to make a valve of simple structure that is easy and inexpensive to make, still a valve that will be especially effective, that will stand hard usage, and not easily wear out.

Figure 1 shows the valve structure mainly in vertical central cross-section. Fig. 2 shows in vertical central cross-section a detail of construction at right angles to that represented in Fig. 1. Fig. 3 is a view in plan of the valve-gate, to which reference will hereinafter be made.

Referring to the drawings, A represents a casting forming the straightaway cylindrical passage $a$ and the cylindrical chamber $a'$, the bore of which chamber is extended by the wall of the casting to form a valvular passage crosswise the straightaway passage $a$ and which valvular passage is of such relative size that the round valve or gate B contained therein may completely close said straightaway passage when in one position or be completely withdrawn into the chamber $a'$ when in another position, leaving the straightaway passage $a$ free and clear.

The round gate B is made in three pieces or sections $b$, $b'$, and $b^2$. The sections $b\ b'$ form the outer rounding portion of the gate, or that portion thereof forming, essentially, its valvular structure, while $b^2$ forms an interior section bearing a peculiar structural and functional relation to the outer enveloping gate-sections, to which reference will hereinafter be made.

The outer gate pieces or sections $b\ b'$ are formed substantially alike in two half-sections, as it were. Each section is made with a rounding exterior to fit when the sections are combined within the chamber $a'$ or the valvular passage extending therefrom, as before explained, and to fit so that the said sections may be held in combination by the rounding wall of said chamber or passage. In this connection it is to be noted that the said gate-sections $b\ b'$ are so fitted that their abutting edges will come at right angles to the straightaway passage when the gate is closed across the same, and so be protected by the adjacent wall of the passage-way against which they bear, thereby eliminating any possibility of leakage from this source.

The vertical extension of the gate, or rather the two valve-forming sections thereof, $b\ b'$, is such that when the gate is closed they will bear against the wall of their valvular passage-way above and below the straightaway passage which they combine to close, bearing along their upper outside edge all around against the wall of their valvular passage-way for an annular seat at the point $a^2$, all around their combined bottom outside edge against the wall of said passage-way for an annular seat at the point $a^3$, and will rest seated upon the annular edge $a^4$, thereby completely closing the straightaway passage.

Upon the inside the gate-sections $b\ b'$ combine to form the upper collar-like projection having a cylindrical inside surface $b^3$ and an under annular edge $b^4$. They also form the conical surface $b^5$, converging from said edge, and at their base form a cylindrical inside surface $b^6$ on lines parallel with the cylindrical surface $b^3$ aforesaid. The interior gate-section $b^2$ is contained within the chamber thus formed by the inside surfaces of the combined sections $b$ and $b'$ just referred to and normally fitting within the same on lines substantially contiguous therewith, the said interior section having a neck $b^7$, around and against which fits the collar-like projection aforesaid, with its cylindrical inside surface $b^3$, an annular shoulder $b^8$, adapted to bear against the annular edge $b^4$, a cone-shaped body $b^9$, the conical surface of which bears against the conical surface $b^5$ aforesaid of the combined sections $b$ and $b'$, and a cylindrical portion $b^{10}$, fitting within the annular base of the said combined sections against its cylindrical inside surface $b^6$. In this connection it is to be noted that the cone-shaped body of the section $b^2$ is somewhat shorter than the conical surface $b^5$, against which it bears, whereby the entire section is made to have some degree of vertical play, or, in other words, can be lifted along the conical surface of its cone-shaped body from a contact with said inside conical surface of the combined gate-sections $b$ and $b'$ before its shoulder $b^8$ contacts with the edge $b^4$ thereof, and this for a purpose as will hereinafter appear. It is also to be noted that although the said section $b^2$ has some degree of vertical play, yet the combined gate-sections $b$ $b'$ would be maintained in proper connection therewith by their contacting along their cylindrical inside surfaces $b^3$ and $b^6$ with the neck $b^7$ or lower cylindrical end $b^{10}$ of said interior section, respectively; but to that reference will hereinafter be made.

The interior gate-section $b^2$ is fixed to the end of a screw-stem C. Any suitable means of connection may be resorted to which permits of the stem being turned up or down, but with the section remaining fixed against turning. I have shown a collar $c$ formed on the end of the stem which slides laterally into a recess $b^{11}$, formed in the top of the section, whereby the section is made to have the same relative degree of vertical movement that the sliding stem has; but the stem turns irrespective of the section.

With the gate-sections $b$ $b'$ $b^2$ thus formed and combined and with the screw C secured to the interior gate-section $b^2$ any motion of the screw is immediately transmitted through the intermediary of the gate-section $b^2$ to the valve-forming sections of the gate, either to spread them laterally, so that they will be pressed against their respective valve-seats, whereby an absolute security is obtained, or by a reversal of the screw the gate-section $b^2$ is drawn up into the chamber $a'$, carrying with it the valve-forming sections of the gate, and this by its shoulder $b^8$ bearing against the edge $b^4$ thereof, as before explained, wherefore the straightaway passage becomes free and clear. The gate is guided along its valvular passage-way and its outer sections $b$ and $b'$ kept from turning by the pin or screw $a^5$, which passes through the wall of the casting A and into the recess $b^{12}$, formed in said outer sections at the point where their edges combine. (See Figs. 2 and 3.)

When the gate is opened any possibility of its cramping against the wall of its valvular passage-way or the wall of the chamber $a'$ is prevented, for upon the opening of the gate, assuming it to be closed, as in Fig. 1, its section $b^2$ first becomes lifted away from its bearing upon the conical surface of the combined gate-sections $b$ $b'$, whereby they are released from lateral pressure before the lifting-shoulder $b^8$ of the interior gate-section contacts against their edge $b^4$ to lift them, so that when the gate is actually raised no pressure is being exerted to bear its valve-forming sections out laterally; but they, and so the gate, move freely along the valvular passage-way into the chamber $a'$.

There might be a tendency to a displacement of the gate-sections $b$ $b'$ by the lifting contact of the shoulder $b^8$ of the gate-section $b^2$, especially upon the opening of the valve, when the cone-shaped body of said section is lifted away from the conical surface $b^5$ of the combined sections. Any tendency to displacement, however, is corrected by the bearing of the cylindrical surfaces $b^3$ and $b^6$ of said combined sections against the neck $b^7$ and the lower cylindrical end $b^{10}$, respectively, of the interior section, as before referred to. The bearing of these parts also helps maintain the parts in proper adjustment during the closing of the valve.

The valvular structure constituting my invention is good primarily because it is so simple. The elements are few and they are practically self-combining and self-adjusting. By reason of their rounding or cylindrical formation the parts or sections, together with the casting within which they are contained, can be easily and inexpensively made or finished by turning or boring and without the necessity of special machine-work.

The valvular structure is effective primarily because the valve or gate can be so securely and uniformly closed or when opened made to move along its valvular passage-way with a perfect freedom of movement, thereby insuring ease of manipulation and preventing wear. The sections forming the gate are made relatively large, so that they cannot easily wear out or break, and their bearing-surfaces are of relatively large extent, also preventing wear. Moreover, by reason of the annular or rounding formation of these surfaces all wear is uniformly distributed or taken up.

Having thus fully described my invention, I claim and desire to secure by Letters Patent of the United States—

1. A valve having a straightaway passage and a valvular passage extending crosswise of the same, a cylindrical gate contained therein adapted when in one position to entirely close said straightaway passage, and when in another position to be entirely drawn up away from the straightaway passage, said gate comprising an exterior section having an axial opening therethrough conical throughout nearly its entire length, and cylindrical at each end, and an interior section of substantially the length of said exterior section and conforming in shape to the internal shape thereof, as and for the purposes described.

2. A valve having a straightaway passage and a valvular passage extending crosswise of the same, a cylindrical gate contained therein adapted when in one position to entirely close said straightaway passage, and when in another position to be entirely drawn away from the same, said gate comprising exterior sections and a cone-shaped interior section having a short cylindrical extension at each end thereof, said interior section being of substantially the length of the exterior section and adapted to bear against substantially the entire length thereof and cause it to positively close said straightaway passage, as and for the purposes set forth.

3. A valve having a straightaway passage and a valvular passage extending crosswise the same, a cylindrical valve or gate contained therein adapted when in one position to entirely close said straightaway passage and when in another position to be entirely drawn away from the same, the said gate comprising exterior sections and an interior section having a cone-shaped body to bear against the exterior sections and essentially relied upon to press them out laterally, a shoulder to raise the same, and cylindrical portions to prevent their displacement at each end thereof, substantially as described.

4. A valve having a straightaway passage and a cylindrical valvular passage extending crosswise the same, a cylindrical valve or gate contained therein adapted when in one position to entirely close said straightaway passage, and when in another position to be drawn entirely away from the same, the said round gate comprising exterior sections $b$ and $b'$, and an interior section $b^2$ combining therewith and cut away to allow vertical play between it and said exterior sections, and provided with cylindrical sections adapted to fit respectively within the cylindrical upper and lower portions of said exterior sections, substantially as described.

5. A valve having a straightaway passage and a cylindrical valvular passage extending crosswise the same, a cylindrical valve or gate contained therein adapted when in one position to entirely close said straightaway passage, and when in another position to be drawn entirely away from the same, the said gate comprising exterior sections and an interior section, the sections being so combined that a conical body formed by the interior section will bear downward against a correspondingly-conical inside surface of the combined exterior sections, when the gate is closed, and an annular shoulder formed by said interior section will bear up against an annular inside edge formed by the said combined exterior sections when the gate is opened, said interior section having two cylindrical sections, one above and one below said conical body, adapted to engage the corresponding inner walls of said exterior sections, the relation of the parts being such that when the gate is opened the interior section will be lifted along its cone-shaped body from bearing upon the said inside conical surface of the combined sections before contacting with the inside annular edges thereof, substantially as and for the purposes set forth.

6. In a blow-off valve of the kind described, having a cylindrical passage and a cylindrical chamber at right angles thereto, a valve adapted to slide in said chamber, means for sliding said valve, said valve comprising exterior sections and an interior section, said exterior sections forming when in place an annular ring, the interior surface of said ring being composed of three surfaces, straight cylindrical surfaces at the interior ends of said ring and a conical surface situated between said cylindrical surfaces, said surfaces being adapted to engage corresponding surfaces on an interior section or conical plug, whereby the exterior sections will be prevented from getting out of parallel position and thereby injuring the cylindrical chamber.

CHARLES B. BOSWORTH.

Witnesses:
F. F. RAYMOND, 2d,
J. M. DOLAN.